United States Patent
Raeesi et al.

(10) Patent No.: US 12,388,502 B2
(45) Date of Patent: Aug. 12, 2025

(54) CONTROL PLANE PROCESSING OF DOWNLINK PRECODING IN AN OPEN RADIO ACCESS NETWORK

(71) Applicant: QUALCOMM Incorporated, San Diego, CA (US)

(72) Inventors: Orod Raeesi, Espoo (FI); Deepak Agarwal, San Diego, CA (US); Hossein Asgharimoghaddam, Espoo (FI); Abhishek Saurabh Sachidanand Sinha, San Diego, CA (US); Kalyan Kuppuswamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 17/820,787

(22) Filed: Aug. 18, 2022

(65) Prior Publication Data
US 2023/0066247 A1    Mar. 2, 2023

Related U.S. Application Data

(60) Provisional application No. 63/236,992, filed on Aug. 25, 2021.

(51) Int. Cl.
*H04B 7/0413*    (2017.01)
*H04B 7/0456*    (2017.01)
*H04W 8/26*    (2009.01)

(52) U.S. Cl.
CPC ............ *H04B 7/046* (2013.01); *H04W 8/26* (2013.01)

(58) Field of Classification Search
CPC .... H04B 7/046; H04B 7/0473; H04B 7/0695; H04B 7/0413; H04W 8/26; H04L 5/0023
(Continued)

(56) References Cited

U.S. PATENT DOCUMENTS 10,080,215 B2 *  9/2018  Chen ................... H04W 72/21
11,043,998 B2 *  6/2021  Ahmed ................ H04W 72/04
(Continued)

FOREIGN PATENT DOCUMENTS

WO    2019183020 A1    9/2019
WO    2021075935 A1    4/2021

OTHER PUBLICATIONS

Umesh et al Title: "Overview of O-RAN Fronthaul Specifications", NTT DOCOMO Technical Journal vol. 21 No. 1 (Jul. 2019); (Year: 2019).*

(Continued)

*Primary Examiner* — Christopher M Crutchfield
*Assistant Examiner* — Syed Ahmed
(74) *Attorney, Agent, or Firm* — Arent Fox, LLP

(57) ABSTRACT

An Open Radio Access Network Category B radio unit (O-RU) of a wireless network associates, for a first extended antenna carrier identifier (eAxC_Id) corresponding to a layer 0 precoding layer identifier (layerID), the first eAxC_Id with one or more second eAxC_Ids. Each second eAxC_Id corresponds to a non-layer 0 precoding layerID. The O-RU receives, for a user equipment (UE), a control plane message of Section Type 1 or 3. The message includes an extension type (ExtType) 3 first data layer, along with the first eAxC_Id in a transport header. The ExtType 3 first data layer indicates a number of precoding layers. The O-RU then precodes user plane data for downlink physical resource blocks allocated to the UE using the layer 0 precoding layerID of the first eAxC_Id, and each associated non-layer 0 precoding layerID of the one more second eAxC_Ids required to complete the number of precoding layers.

20 Claims, 10 Drawing Sheets

(58) Field of Classification Search
USPC .......................................................... 370/329
See application file for complete search history.

(56) References Cited

U.S. PATENT DOCUMENTS

| | | | |
|---|---|---|---|
| 11,778,632 B2* | 10/2023 | Jeon .................... | H04W 72/046 |
| | | | 455/452.1 |
| 11,831,579 B2* | 11/2023 | Rajagopal ............. | H04L 5/0053 |
| 2021/0120531 A1* | 4/2021 | Jeon et al. ............... | H04B 7/06 |
| 2021/0136788 A1 | 5/2021 | Lim et al. | |
| 2023/0007663 A1* | 1/2023 | Wu ....................... | H04L 5/0094 |

OTHER PUBLICATIONS

Zenir, Maher. ECPRI timing measurement and testing for 5G New Radio. MS thesis. M. Zenir, 2020. (Year: 2020).*
International Search Report and Written Opinion—PCT/US2022/075232—ISA/EPO—Nov. 23, 2022.

* cited by examiner

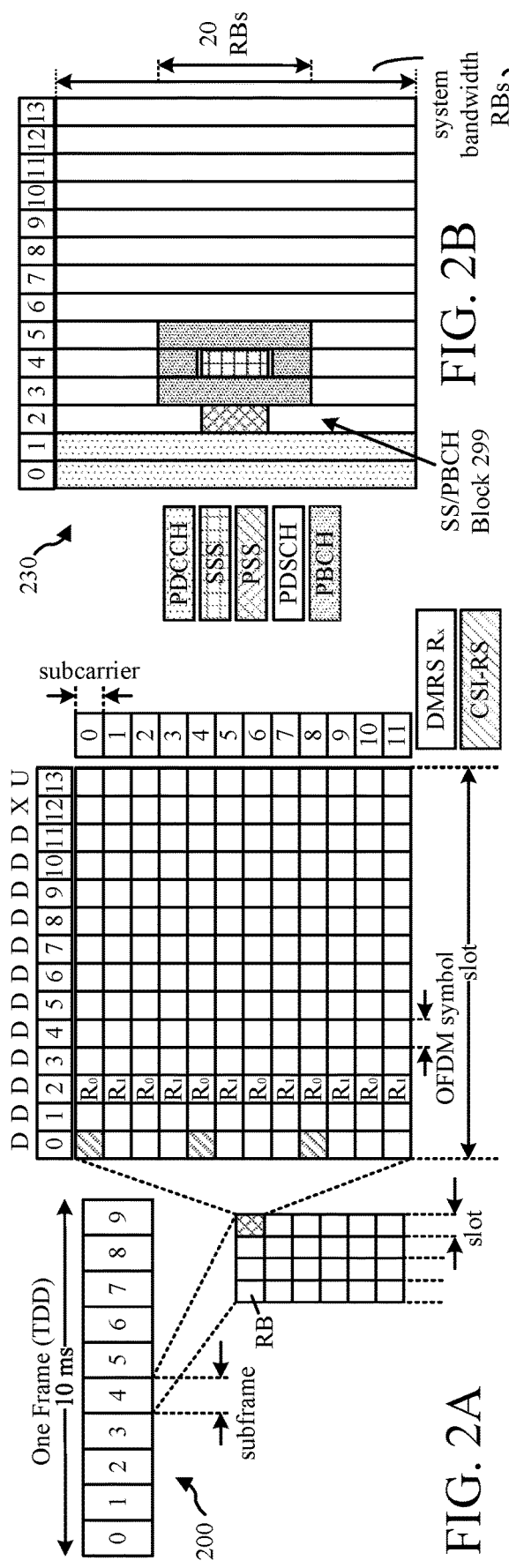
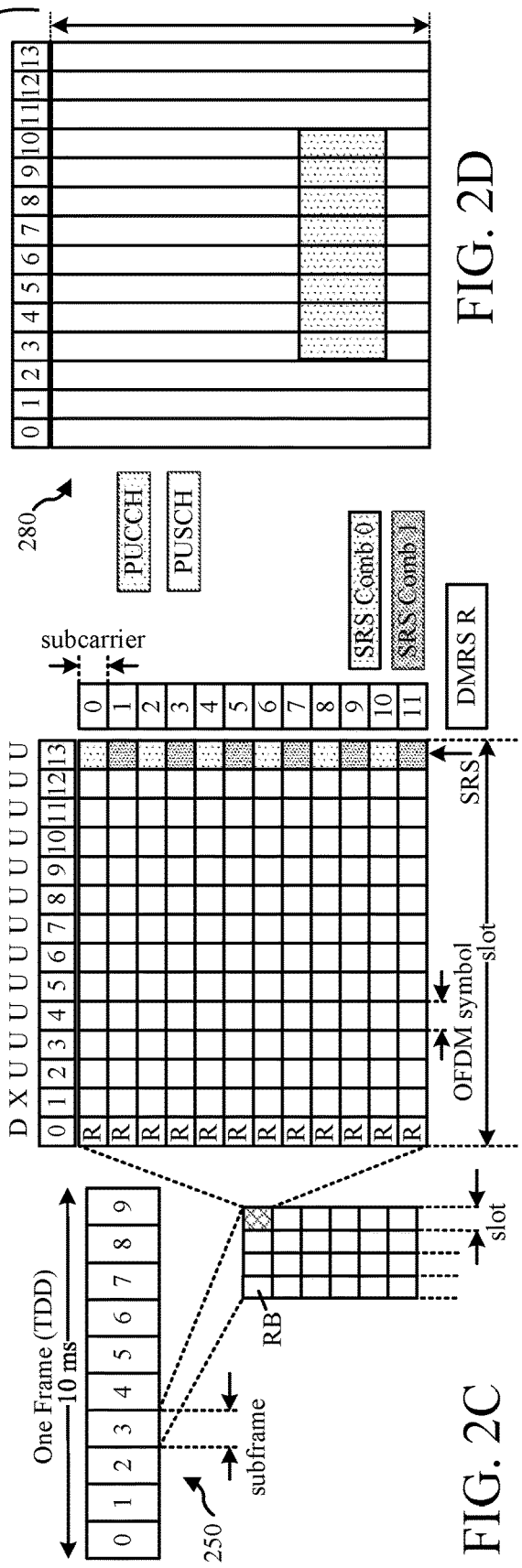
FIG. 2A
FIG. 2B
FIG. 2C
FIG. 2D

Scheduling and beamforming commands frame format (Section Type "1")

| 0 (msb) | 1 | 2 | 3 | 4 | 5 | 6 | 7 (lsb) | bytes | Octet |
|---|---|---|---|---|---|---|---|---|---|
| Transport header w/eAxC_Id as ecpriRtcid in Octets 5-7 - 510 ||||||||  8 | 1-8 |
| Application layer header w/frame, subframe, slot, start symbol info - 520 |||||||| 8 | 9-16 |
| Section info w/start prbc, numprbc, 1st beam ID, and extension flag - 530 |||||||| 8 | 17-24 |

Extension Type 3 Data Format – first data layer - 540

| 0 (msb) | 1 | 2 | 3 | 4 | 5 | 6 | 7 (lsb) | of byte | Octet |
|---|---|---|---|---|---|---|---|---|---|
| ef | extType = 0x03 ||||||| 1 | N |
| extLen = 0x04 (4 words) |||||||| 1 | N+1 |
| codebookIndex |||||||| 1 | N+2 |
| layerId = 0000b or 1111b |||| numLayers[3:0] |||| 1 | N+3 |
| txScheme[3:0] |||| crsReMask[11:8] |||| 1 | N+4 |
| crsReMask[7:0] |||||||| 1 | N+5 |
| crsShift | reserved ||| crsSymNum[3:0] |||| 3 | N+6 |
| reserved |||||||| 1 | N+7 |
| reserved | beamIdAP1[14:8] ||||||| 1 | N+10 |
| beamIdAP1[7:0] |||||||| 1 | N+11 |
| reserved | beamIdAP2[14:8] ||||||| 1 | N+12 |
| beamIdAP2[7:0] |||||||| 1 | N+13 |
| reserved | beamIdAP3[14:8] ||||||| 1 | N+14 |
| beamIdAP3[7:0] |||||||| 1 | N+15 |

Extension Type 3 Data Format – non-first data layer - 550

| 0 (msb) | 1 | 2 | 3 | 4 | 5 | 6 | 7 (lsb) | of byte | Octet |
|---|---|---|---|---|---|---|---|---|---|
| ef | extType = 0x03 ||||||| 1 | N |
| extLen = 0x04 (4 words) |||||||| 1 | N+1 |
| codebookIndex |||||||| 1 | N+2 |

FIG. 5

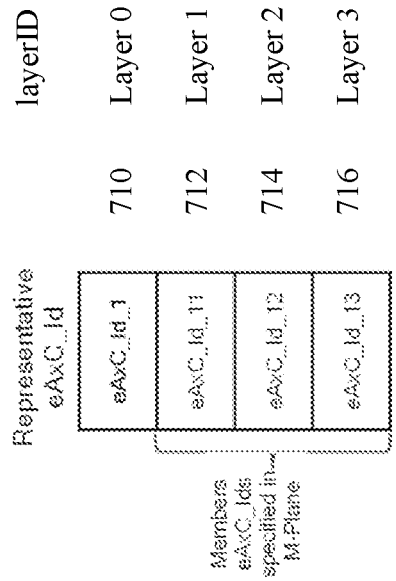
FIG. 7A
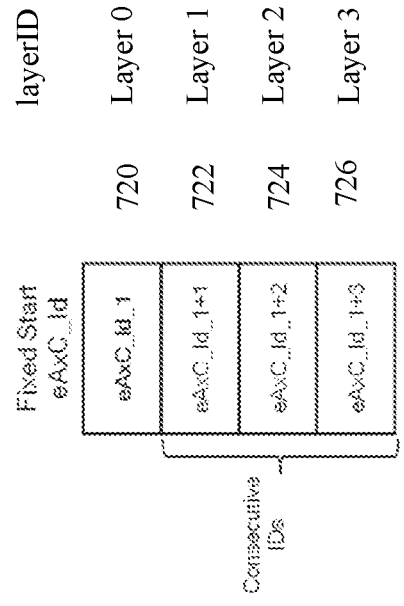
FIG. 7B
FIG. 7

800

610
For a first extended antenna carrier identifier (eAxC_Id) corresponding to a layer 0 precoding layer identifier (layerID), associate the first eAxC_Id with one or more second eAxC_Ids, each second eAxC_Id corresponding to a different non-layer 0 precoding layerID.

820
Receive:
i) for each of at least one user equipment (UE), a first control plane (C-Plane) message of Section Type 1 or Section Type 3, wherein the first C-Plane message comprises an extension type (ExtType) 3 first data layer and includes the first eAxC_ID in a transport header of the first C-Plane message, and wherein the ExtType 3 first data layer indicates a number of precoding layers; and
ii) for a particular UE of the at least one UE, a set of subsequent C-Plane messages of the Section Type of the first C-Plane message, each subsequent C-Plane message comprising 1) a different second eAxC_ID, and 2) an ExtType 3 non-first data layer specifying a different precoding non-layer 0 layerID, wherein the first C-Plane message and the set of subsequent C-Plane messages specify each possible precoding layer associated with ExtType 3.

830
Precode user plane (U-Plane) data for downlink physical resource blocks allocated to each at least one UE using the layer 0 precoding layerID of the first eAxC_ID, and each associated non-layer 0 precoding layerID of the one more second eAxC_Ids required to complete the number of precoding layers; and using the association across physical resource blocks of a particular slot and particular carrier allocated across the particular UE and any subsequent UE scheduled for the particular slot and particular carrier.

FIG. 8

| UE1 scheduled with 4 layers TM4 | UE2 scheduled with 1 layer TM2 | UE3 scheduled with 2 layers TM3 |
|---|---|---|
| C-Plane Section with long-format-ext3<br>• Layerid =0->eAxC_Id: 10<br>Section+short-format-ext3<br>• Layerid =1->eAxC_Id: 20<br>Section+short-format-ext3<br>• Layerid =2->eAxC_Id: 30<br>Section+short-format-ext3<br>• Layerid =3->eAxC_Id: 40 | C-Plane Section+long-format-ext3<br>• Layerid=0->eAxC_Id: 10 | C-Plane Section+long-format-ext3<br>• Layerid =0->eAxC_Id: 10<br>Section+short-format-ext3<br>• Layerid =1->eAxC_Id: 20 |
| eAxC_Id: 10     Layer_0<br>eAxC_Id: 20     Layer_1<br>eAxC_Id: 30     Layer_2<br>eAxC_Id: 40     Layer_3 | Re-use the mapping created by UE1 | Re-use the mapping created by UE1 |

CONTROL PLANE PROCESSING OF DOWNLINK PRECODING IN AN OPEN RADIO ACCESS NETWORK

CROSS REFERENCE TO RELATED APPLICATIONS

This application claims the benefit of U.S. Provisional Application No. 63/236,992, filed Aug. 25, 2021 and titled "CONTROL PLANE PROCESSING OF DOWNLINK PRECODING IN AN OPEN RADIO ACCESS NETWORK;" the contents of which are hereby incorporated herein in their entirety.

TECHNICAL FIELD

The present disclosure relates generally to communication systems, and more particularly in some examples, to control plane processing in Node B of a wireless communication network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

The technology disclosed herein includes method, apparatus, and computer-readable media including instructions for wireless communication. Examples of the technology apply to a Node B Open Radio Access Network (O-RAN) Category B radio unit (O-RU) of a wireless communication network. In some examples, the O-RU associates, for a first extended antenna carrier identifier (eAxC_Id) corresponding to a layer 0 precoding layer identifier (layerID), the first eAxC_Id with one or more second eAxC_Ids. Each second eAxC_Id corresponds to a different non-layer 0 precoding layerID. The O-RU receives, for each of at least one user equipment (UE), a first control plane (C-Plane) message of Section Type 1 or Section Type 3. The first C-Plane message includes an extension type (ExtType) 3 first data layer and includes the first eAxC_Id in a transport header of the first C-Plane message. The ExtType 3 first data layer indicates a number of precoding layers. The O-RU then precodes user plane (U-Plane) data for downlink physical resource blocks allocated to each at least one UE using the layer 0 precoding layerID of the first eAxC_Id, and each associated non-layer 0 precoding layerID of the one more second eAxC_Ids required to complete the number of precoding layers.

In some examples of the technology disclosed herein, the associating is performed in a management plane (M-Plane) of the O-RU. In some such examples, the associating includes using an O-RAN EAXC-ID-GROUP-SUPPORTED function with 1) the first eAxC_Id corresponding to the layer 0 precoding layerID as a representative eAxC_Id of the function, and 2) each second eAxC_Id corresponding to a non-layer 0 precoding layerID as a member eAxC_Id of the function. In other such examples, In some examples, configuring includes receiving, by the UE from the network in DL, the one or more conditions. In some such examples, the associating includes identifying the first eAxC_Id corresponding to the layer 0 precoding layerID as a starting eAxC_Id, and the one or more second eAxC_Ids in order of increasing corresponding layerID as consecutive to the first eAxC_Id.

In some examples, the receiving occurs before the associating. In such examples, the receiving further includes, for a particular UE of the at least one UE, receiving a set of subsequent C-Plane messages of the Section Type of the first C-Plane message. Each subsequent C-Plane message includes 1) a different second eAxC_Id, and 2) an ExtType 3 non-first data layer specifying a different precoding non-layer 0 layerID. The first C-Plane message and the set of subsequent C-Plane messages specify each possible precoding layer associated with ExtType 3. In such examples, in addition to the precoding for the first UE described above, the O-RU using the association across physical resource blocks of a particular slot and a particular carrier allocated across the particular UE and any subsequent UE scheduled for the particular slot and the particular carrier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 5 is an example of C-Plane message formats, in accordance with examples of the technology disclosed herein.

FIG. 7A and FIG. 7B are example associations between eAxC_Ids and layerIDs, in accordance with examples of the technology disclosed herein.

FIG. 8 is a flowchart of methods of wireless communication is shown, in accordance with examples of the technology disclosed herein.

FIG. 9 is an example of establishment and re-use of associations between eAxC_Ids and layerIDs, in accordance with examples of the technology disclosed herein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Wireless communication networks can be described as including a radio access network (RAN) and a core network. The RAN provides an interface for user equipment (UE) such as mobile phones and wireless Internet-of-Things (IoT) devices to access the core network—and, through the core network, communication resources such as the public switched telephone network and the Internet). The Open Radio Access Network (O-RAN) Alliance was established by a group of wireless communication companies to develop interoperability standards for RAN elements built from "white box" hardware and software independent of vendor. O-RAN Alliance standards are intended to be complimentary top 3GPP standards, and are based on an O-RAN architecture with various functional splits between elements of the architecture.

Figure 4:
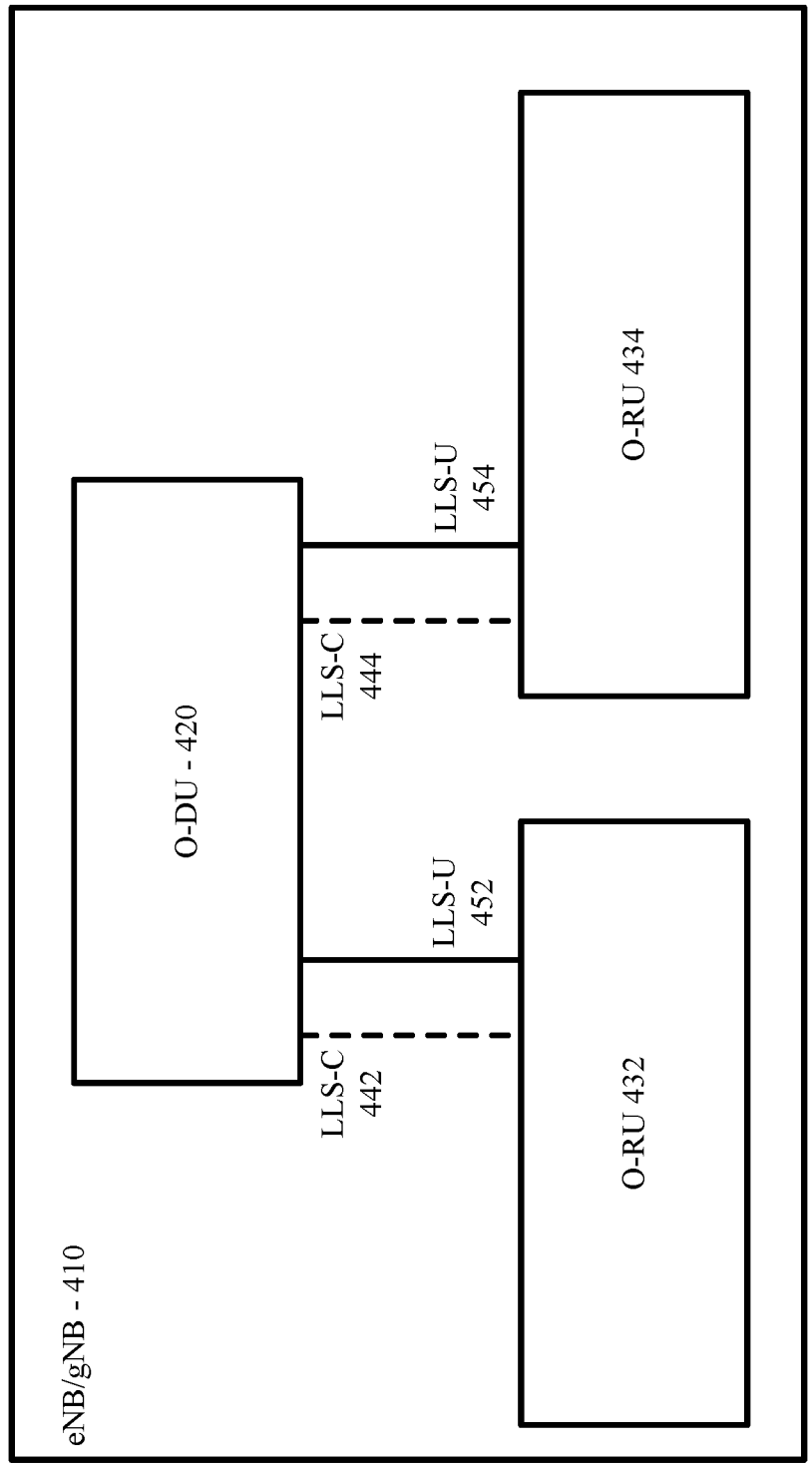
FIG. 4 is a block diagram illustrating an O-RAN architecture for a Node B, in accordance with examples of the technology disclosed herein.

Referring to FIG. 4, in the architecture 400 of one such split, a Node B (e.g., eNB or gNB as described below) 410 includes an O-RAN distributed unit (O-DU) 420 and one or more O-RAN radio units (O-RU) 432, 434. The O-DU 420 is a logical node that includes eNB/gNB functions such as scrambling, modulation, layer mapping, precoding (with bypass mode possible), resource element (RE) mapping, and in-phase/quadrature (IQ) compression (optional). The O-RU 432, 434 is another logical node that includes eNB/gNB functions such as IQ decompression (optional, and paired with IQ compression in the O-DU 420), digital beamforming (optional), inverse Fast Fourier Transform (iFFT) and cyclic prefix (CP) addition, digital-to-analog conversion, analog beamforming (optional), and (relevant to this disclosure) optional precoding in Category B O-RUs. O-RAN specifications, such as O-RAN.WG4.CUS.0-v07.00, explain that an O-DU 420 controls the operation of one or more O_RUs 432, 434 over interfaces such as lower level split control plane (LLS-C 442, 444 or "C-Plane") and the lower level split user plane (LLS-U 452, 454 or "U-Plane"). "Lower level" in this case refers to Layer 1/physical layer in 3GPP terms.

For a Category B O-RU to implement the type of pre-coding called for in LTE transmission mode 2 (TM2), TM3, and TM4 some specific C-Plane messages need to be provided to the O-RU from the O-DU. The current O-RAN specification covering C-Plane messages, O-RAN.WG4.CUS.0-v07.00, organizes C-Plane messages by "Section Type," from Section Type 0-Section Type 7, of which Section Type 1 and Section Type 3 are relevant to precoding in an O-RU 432, 434.

Referring to FIG. 5, a Section Type 1 message format 500 is shown as an example. A common frame format is used for C-Plane messages, consisting of a transport layer and an application layer. The application layer is within the transport layer payload and consists of a common header for time reference, followed by information and parameters dependent and specific to the Section Type in use. Multiple sets of section data of the same Section Type value can be lined up one after another within the payload.

Each C-Plane Section Type 1 and Section Type 3 message includes a transport header 510 that carries an extended antenna carrier identifier (eAxC_Id) as an enhanced common public radio interface real time control data/IQ data transfer message series identifier (ecpriRtcid). Each such message 500 also includes an application layer header 520 carrying resource grid location information down to the symbol level describing where the U-Plane information subject to the intended precoding will be transmitted in downlink from the O-RU to one or more UEs. The transport header 510 and application layer header 520 are followed by one or more "sections," e.g., section 530. Each section 530 contains finer grain resource grid information such as start physical resource block (prbc), number of prbcs, number of symbols, the first of one or more beam IDs, and (relevant to the present technology) a section extension flag.

If the section extension flag in the section 530 is set, then the section will be followed by an extension in the C-Plane message. There are twenty (20) extension types (ExtType), of which ExtType 3—DL Precoding Extension Type is relevant to the present disclosure. ExtType 3 is used only for precoding in LTE TM2, TM3, and TM4 operation and is characterized by two separate formats—ExtType 3 first data layer 540 and ExtType 3 non-first data layer 550. ExtType 3 first data layer 540 and ExtType 3 non-first data layer 550 are appended to different C-Plane messages.

The current O-RAN-WG4.CUS.0-v07.00 specification does not have a mechanism to associate a given ExtType 3 first data layer 540 (sent in one C-Plane message with a first eAxC_Id in the transport header 510) with any corresponding ExtType 3 non-first data layer 550 (sent in a separate C-Plane messages, each with a different eAxC_Id) when ExtType-3 is used for LTE TM-3 &TM4.

One option would be to identify the association of all ExtType-3 layers for a single resource grid allocation is to search through the allocations across all eAxC_Ids. This would be a resource-intensive approach that could introduce unacceptable processing latency to the O-RU—a problem that can be aggravated in the single user multiple input multiple output (SU-MIMO) case with multiple UEs, each UE having a unique allocation within a slot.

The present technology establishes an association between ExtType 3 first data layer messages and ExtType 3 non-first data layer messages used for precoding U-Plane data in LTE TM2, TM3, and TM4 operation. In some examples that are more static, the association is established in the M-Plane. In other examples that are more dynamic, the association is established in the C-Plane and can be established down to the symbol level.

In some aspects, the O-RU associates, for a first extended antenna carrier identifier (eAxC_Id) corresponding to a layer 0 precoding layer identifier (layerID), the first eAxC_Id with one or more second eAxC_Ids. Each second eAxC_Id corresponds to a different non-layer 0 precoding layerID. The O-RU receives, for each of at least one user equipment (UE), a first control plane (C-Plane) message of Section Type 1 or Section Type 3. The first C-Plane message includes an extension type (ExtType) 3 first data layer and includes the first eAxC_Id in a transport header of the first C-Plane message. The ExtType 3 first data layer indicates a number of precoding layers. The O-RU then precodes user plane (U-Plane) data for downlink physical resource blocks allocated to each at least one UE using the layer 0 precoding layerID of the first eAxC_Id, and each associated non-layer 0 precoding layerID of the one more second eAxC_Ids required to complete the number of precoding layers.

In some examples of the technology disclosed herein, the associating is performed in a management plane (M-Plane) of the O-RU. In some such examples, the associating includes using an O-RAN EAXC-ID-GROUP-SUPPORTED function with 1) the first eAxC_Id corresponding to the layer 0 precoding layerID as a representative eAxC_Id of the function, and 2) each second eAxC_Id corresponding to a non-layer 0 precoding layerID as a member eAxC_Id of the function. In other such examples, In some examples, configuring includes receiving, by the UE from the network in DL, the one or more conditions. In some such examples, the associating includes identifying the first eAxC_Id corresponding to the layer 0 precoding layerID as a starting eAxC_Id, and the one or more second eAxC_Ids in order of increasing corresponding layerID as consecutive to the first eAxC_Id.

In some examples, the receiving occurs before the associating. In such examples, the receiving further includes, for a particular UE of the at least one UE, receiving a set of subsequent C-Plane messages of the Section Type of the first C-Plane message. Each subsequent C-Plane message includes 1) a different second eAxC_Id, and 2) an ExtType 3 non-first data layer specifying a different precoding non-layer 0 layerID. The first C-Plane message and the set of subsequent C-Plane messages specify each possible precoding layer associated with ExtType 3. In such examples, in addition to the precoding for the first UE described above, the O-RU using the association across physical resource blocks of a particular slot and a particular carrier allocated across the particular UE and any subsequent UE scheduled for the particular slot and the particular carrier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
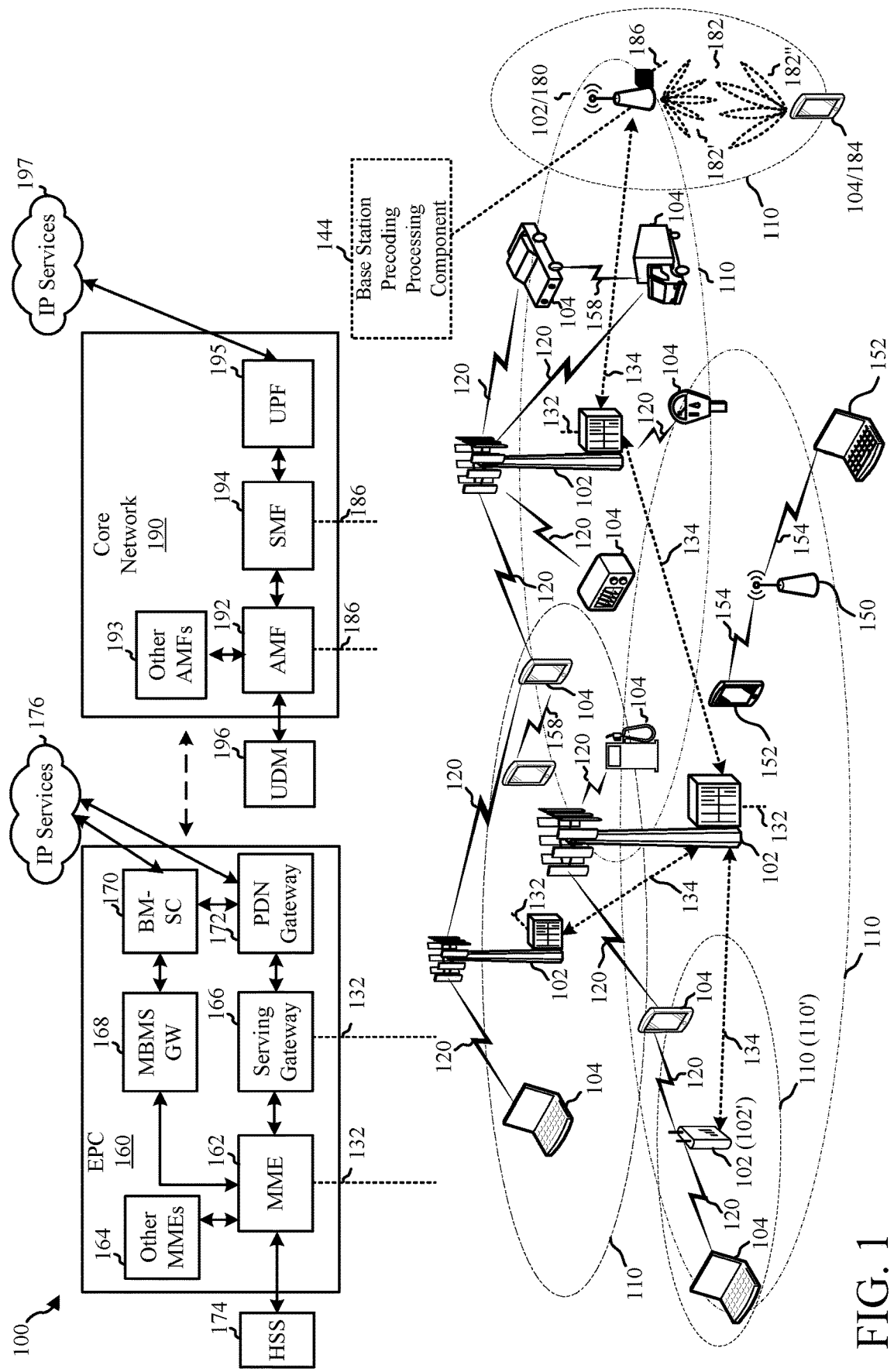
FIG. 1 is a diagram illustrating an example of a wireless communications system and an access network.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 186. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links 132, 186 and 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. In some examples of the technology disclosed herein, both the DL and the UL between the base station and a UE use the same set of multiple beams to transmit/receive physical channels. For example, a given set of beams can carry the multiple copies of a Physical Downlink Shared Channel (PDSCH) on the DL and can carry multiple copies of a Physical Uplink Control Channel (PUCCH) on the UL.

The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in one or more frequency bands within the electromagnetic spectrum. The base station 180 and the UE 104 may each include a plurality of antennas, such as antenna elements, antenna panels, and/or antenna arrays to facilitate the beamforming.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming with the UE 104/184 to compensate for the path loss and short range using beams 182.

The base station 180 may transmit a beamformed signal to the UE 104/184 in one or more transmit directions 182'. The UE 104/184 may receive the beamformed signal from the base station 180 in one or more receive directions 182". The UE 104/184 may also transmit a beamformed signal to the base station 180 in one or more transmit directions. The base station 180 may receive the beamformed signal from the UE 104 in one or more receive directions. The base station 180/UE 104/184 may perform beam training to determine the best receive and transmit directions for each of the base station 180/UE 104/184. The transmit and receive directions for the base station 180 may or may not be the same. The transmit and receive directions for the UE 104/184 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Continuing to refer to FIG. 1, in some aspects the base station 102 is an O-RAN-compliant Node B including an O-RAN distributed unit (O-DU) and an O-RAN radio unit (O-RU). The O-RU associates, for a first extended antenna carrier identifier (eAxC_Id) corresponding to a layer 0 precoding layer identifier (layerID), the first eAxC_Id with one or more second eAxC_Ids. Each second eAxC_Id corresponds to a different non-layer 0 precoding layerID. The O-RU receives, for each of at least one user equipment (UE), a first control plane (C-Plane) message of Section Type 1 or Section Type 3. The first C-Plane message includes an extension type (ExtType) 3 first data layer and includes the first eAxC_Id in a transport header of the first C-Plane message. The ExtType 3 first data layer indicates a number of precoding layers. The O-RU then precodes user plane (U-Plane) data for downlink physical resource blocks allocated to each at least one UE using the layer 0 precoding layerID of the first eAxC_Id, and each associated non-layer 0 precoding layerID of the one more second eAxC_Ids required to complete the number of precoding layers.

In some examples of the technology disclosed herein, the associating is performed in a management plane (M-Plane) of the O-RU. In some such examples, the associating includes using an O-RAN EAXC-ID-GROUP-SUPPORTED function with 1) the first eAxC_Id corresponding to the layer 0 precoding layerID as a representative eAxC_Id of the function, and 2) each second eAxC_Id corresponding to a non-layer 0 precoding layerID as a member eAxC_Id of the function. In other such examples, In some examples, configuring includes receiving, by the UE from the network in DL, the one or more conditions. In some such examples, the associating includes identifying the first eAxC_Id corresponding to the layer 0 precoding layerID as a starting eAxC_Id, and the one or more second eAxC_Ids in order of increasing corresponding layerID as consecutive to the first eAxC_Id.

In some examples, the receiving occurs before the associating. In such examples, the receiving further includes, for a particular UE of the at least one UE, receiving a set of subsequent C-Plane messages of the Section Type of the first C-Plane message. Each subsequent C-Plane message includes 1) a different second eAxC_Id, and 2) an ExtType 3 non-first data layer specifying a different precoding non-layer 0 layerID. The first C-Plane message and the set of subsequent C-Plane messages specify each possible precoding layer associated with ExtType 3. In such examples, in addition to the precoding for the first UE described above, the O-RU using the association across physical resource blocks of a particular slot and a particular carrier allocated across the particular UE and any subsequent UE scheduled for the particular slot and the particular carrier.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE.

The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK)/negative ACK (NACK) feedback. The PUSCH carries data and may additionally be used to carry a buffer status report (BSR), a power headroom report (PHR), and/or UCI.

Figure 3:
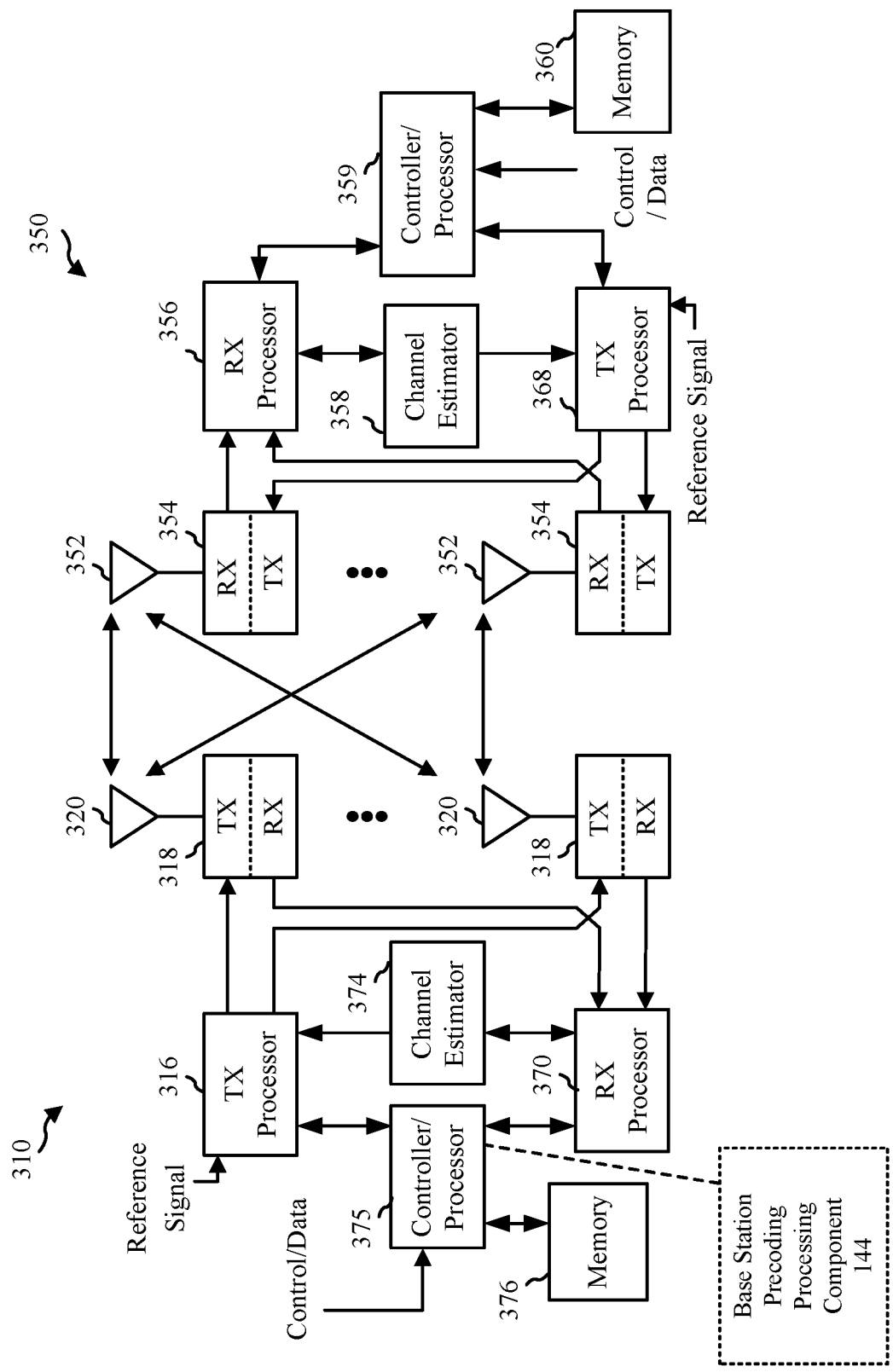
FIG. 3 is a diagram illustrating a base station and user equipment (UE) in an access network, in accordance with examples of the technology disclosed herein.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Continuing to refer to FIG. 3, and continuing to refer to prior figures for context, in some aspects the base station 310 is an O-RAN-compliant Node B including an O-RAN distributed unit (O-DU) and an O-RAN radio unit (O-RU). The O-RU associates, for a first extended antenna carrier identifier (eAxC_Id) corresponding to a layer 0 precoding layer identifier (layerID), the first eAxC_Id with one or more second eAxC_Ids. Each second eAxC_Id corresponds to a different non-layer 0 precoding layerID. The O-RU receives, for each of at least one user equipment (UE), a first control plane (C-Plane) message of Section Type 1 or Section Type 3. The first C-Plane message includes an extension type (ExtType) 3 first data layer and includes the first eAxC_Id in a transport header of the first C-Plane message. The ExtType 3 first data layer indicates a number of precoding layers. The O-RU then precodes user plane (U-Plane) data for downlink physical resource blocks allocated to each at least one UE using the layer 0 precoding layerID of the first eAxC_Id, and each associated non-layer 0 precoding layerID of the one more second eAxC_Ids required to complete the number of precoding layers.

In some examples of the technology disclosed herein, the associating is performed in a management plane (M-Plane) of the O-RU. In some such examples, the associating includes using an O-RAN EAXC-ID-GROUP-SUPPORTED function with 1) the first eAxC_Id corresponding to the layer 0 precoding layerID as a representative eAxC_Id of the function, and 2) each second eAxC_Id corresponding to a non-layer 0 precoding layerID as a member eAxC_Id of the function. In other such examples, In some examples, configuring includes receiving, by the UE from the network in DL, the one or more conditions. In some such examples, the associating includes identifying the first eAxC_Id corresponding to the layer 0 precoding layerID as a starting eAxC_Id, and the one or more second eAxC_Ids in order of increasing corresponding layerID as consecutive to the first eAxC_Id.

In some examples, the receiving occurs before the associating. In such examples, the receiving further includes, for a particular UE of the at least one UE, receiving a set of subsequent C-Plane messages of the Section Type of the first C-Plane message. Each subsequent C-Plane message includes 1) a different second eAxC_Id, and 2) an ExtType 3 non-first data layer specifying a different precoding non-layer 0 layerID. The first C-Plane message and the set of subsequent C-Plane messages specify each possible precoding layer associated with ExtType 3. In such examples, in addition to the precoding for the first UE described above, the O-RU using the association across physical resource blocks of a particular slot and a particular carrier allocated across the particular UE and any subsequent UE scheduled for the particular slot and the particular carrier.

Figure 6:
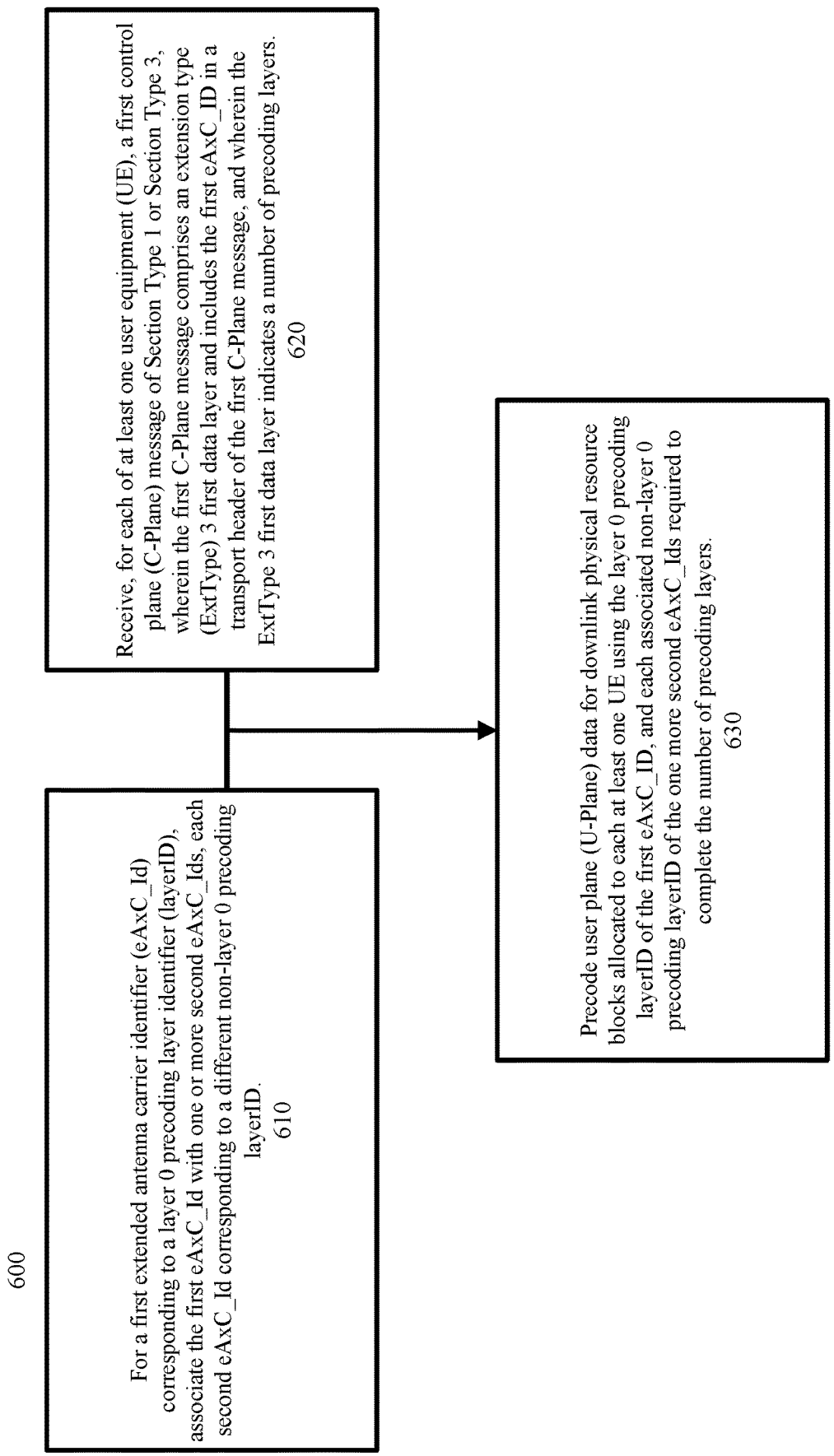
FIG. 6 is a flowchart of methods of wireless communication is shown, in accordance with examples of the technology disclosed herein.

Referring to FIG. 6, and continuing to refer to prior figures for context, a flowchart of methods 600 of wireless communication is shown, in accordance with examples of the technology disclosed herein. Such methods can be implemented in a Node B Open Radio Access Network (O-RAN) Category B radio unit (O-RU) of a wireless communication network. In such methods 600, the O-RU associates, for a first extended antenna carrier identifier (eAxC_Id) corresponding to a layer 0 precoding layer identifier (layerID), the first eAxC_Id with one or more second eAxC_Ids-Block 610. Each second eAxC_Id corresponds to a different non-layer 0 precoding layerID.

In some examples, such as those shown in FIG. 7, the associating is performed in a management plane (M-Plane) of the O-RU. In some such examples, such as the example shown in FIG. 7A, the associating includes using an O-RAN EAXC-ID-GROUP-SUPPORTED function with 1) the first eAxC_Id 710 corresponding to the layer 0 precoding layerID as a representative eAxC_Id of the function as shown in FIG. 7A, and 2) each second eAxC_Id 712-7116 corresponding to a non-layer 0 precoding layerID as a member eAxC_Id of the function.

In other such examples, such as the example shown in FIG. 7B, the associating comprises identifying the first eAxC_Id 720 corresponding to the layer 0 precoding layerID as a starting eAxC_Id, and the one or more second eAxC_Ids 722-726 in order of increasing corresponding layerID as consecutive to the first eAxC_Id.

Figure 10:
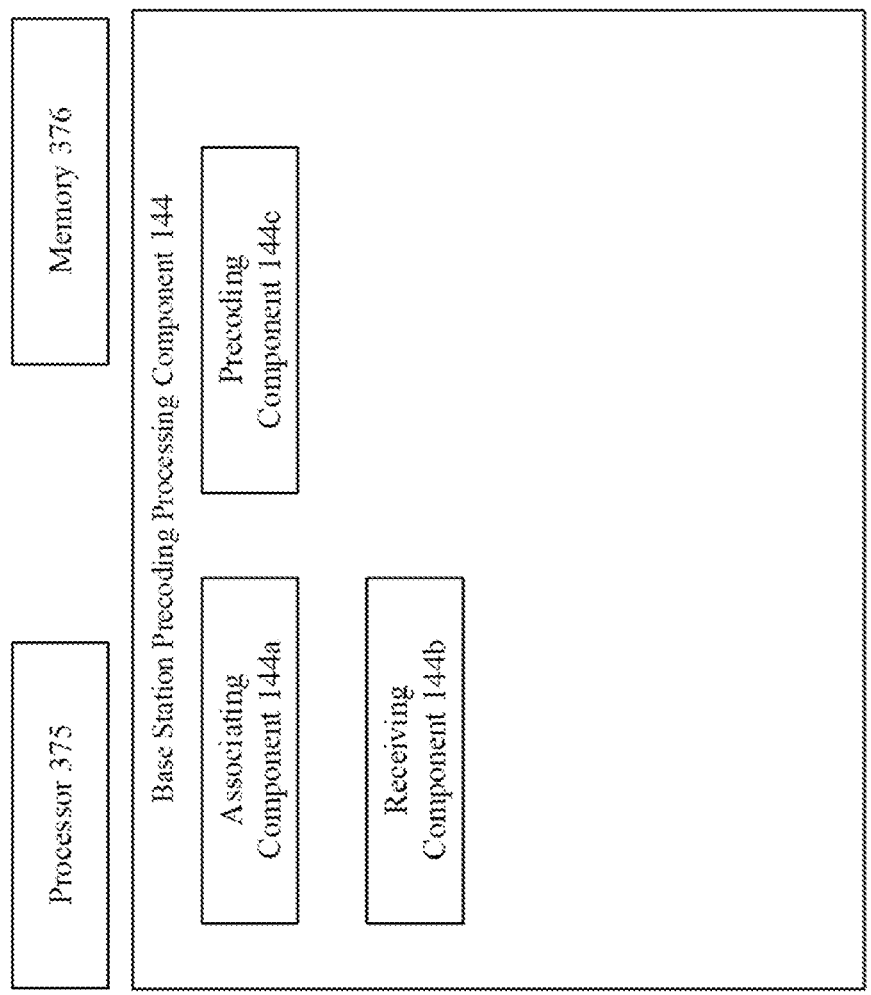
FIG. 10 is a block diagram of a base station, in accordance with examples of the technology disclosed herein.

Referring to FIG. 10, and continuing to refer to prior figures for context, another representation of the base station 310 for wireless communication of FIG. 3 is shown, in accordance with examples of the technology disclosed herein. Base station 310 includes base station precoding processing component 144, controller/processor 375, and memory 376, as described in conjunction with FIG. 3 above. Base station precoding processing component 144 includes associating component 144a. In some examples, the associating component 144a associates, for a first extended antenna carrier identifier (eAxC_Id) corresponding to a layer 0 precoding layer identifier (layerID), the first eAxC_Id with one or more second eAxC_Ids. Accordingly, associating component 144a may provide means for associating, for a first extended antenna carrier identifier (eAxC_Id) corresponding to a layer 0 precoding layer identifier (layerID), the first eAxC_Id with one or more second eAxC_Ids.

Referring again to FIG. 6, the O-RU receives, for each of at least one user equipment (UE), a first control plane (C-Plane) message of Section Type 1 or Section Type 3—Block 620. The first C-Plane message includes an extension type (ExtType) 3 first data layer and includes the first eAxC_Id in a transport header of the first C-Plane message. The ExtType 3 first data layer indicates a number of precoding layers.

Referring to FIG. 10, and continuing to refer to prior figures for context, base station precoding processing component 144 includes receiving component 144b. In some examples, the receiving component 144b receives, for each of at least one user equipment (UE), a first control plane (C-Plane) message of Section Type 1 or Section Type 3. Accordingly, receiving component 144b may provide means for receiving, for each of at least one user equipment (UE), a first control plane (C-Plane) message of Section Type 1 or Section Type 3.

Referring again to FIG. 6, the O-RU precodes user plane (U-Plane) data for downlink physical resource blocks allocated to each at least one UE using the layer 0 precoding layerID of the first eAxC_Id, and each associated non-layer 0 precoding layerID of the one more second eAxC_Ids required to complete the number of precoding layers—Block 630.

Referring to FIG. 10, and continuing to refer to prior figures for context, base station precoding processing component 144 includes precoding component 144c. In some examples, the precoding component 144c precodes user plane (U-Plane) data for downlink physical resource blocks allocated to each at least one UE using the layer 0 precoding layerID of the first eAxC_Id, and each associated non-layer 0 precoding layerID of the one more second eAxC_Ids required to complete the number of precoding layers. Accordingly, precoding component 144c may provide means for precoding user plane (U-Plane) data for downlink physical resource blocks allocated to each at least one UE using the layer 0 precoding layerID of the first eAxC_Id, and each associated non-layer 0 precoding layerID of the one more second eAxC_Ids required to complete the number of precoding layers.

Referring to FIG. 8, and continuing to refer to prior figures for context, a flowchart of methods 800 of wireless communication is shown, in accordance with examples of the technology disclosed herein. In such methods 800, Block 610 is performed as described in conjunction with FIG. 6, and the receiving step is performed before the associating step. The method 800 of FIG. 8 (in addition to receiving, for each of at least one UE, a first C-Plane message of Section Type 1 or Section Type 3), receives, for a particular UE of the at least one UE, a set of subsequent C-Plane messages of the Section Type of the first C-Plane message—Block 820. Each subsequent C-Plane message includes 1) a different second eAxC_Id, and 2) an ExtType 3 non-first data layer specifying a different precoding non-layer 0 layerID. Further, the first C-Plane message and the set of subsequent C-Plane messages specify each possible precoding layer associated with ExtType 3.

Referring to FIG. 10, and continuing to refer to prior figures for context, base station precoding processing component 144 includes receiving component 144b. In some examples, the receiving component 144b (in addition to receiving, for each of at least one UE, a first C-Plane message of Section Type 1 or Section Type 3), receives, for a particular UE of the at least one UE, a set of subsequent C-Plane messages of the Section Type of the first C-Plane message. Accordingly, receiving component 144b may provide means for (in addition to receiving, for each of at least one UE, a first C-Plane message of Section Type 1 or Section Type 3), receives, for a particular UE of the at least one UE, a set of subsequent C-Plane messages of the Section Type of the first C-Plane message.

Further in the method 800 of FIG. 8, in addition to the precoding for the first UE described above, the O-RU uses the association across physical resource blocks of a particular slot and a particular carrier allocated across the particular UE and any subsequent UE scheduled for the particular slot and the particular carrier—Block 830.

Referring to FIG. 10, and continuing to refer to prior figures for context, base station precoding processing component 144 includes precoding component 144c. In some examples, the precoding component 144c in addition to the precoding for the first UE described above, uses the association across physical resource blocks of a particular slot and a particular carrier allocated across the particular UE and any subsequent UE scheduled for the particular slot and the particular carrier. Accordingly, precoding component 144c may provide means for in addition to the precoding for the first UE described above, using the association across physical resource blocks of a particular slot and a particular carrier allocated across the particular UE and any subsequent UE scheduled for the particular slot and the particular carrier.

Referring to FIG. 9, and continuing to refer to prior figures for context, an example scenario 900 in accordance with method 800 with three (3) UEs (UE1, UE2, and UE3) in a single slot over a single carrier is shown. In the example, after receiving, for UE1, a first C-Plane message of Section Type 3 with a first eAxC_Id and a layerID for layer 0 (in an ExtType 3 extension format for the first data layer), the O-RU receives, also for UE1, a set of subsequent C-Plane Section Type 3 messages. Each of these subsequent C-Plane messages includes a different second eAxC_Id (eAxC_Id 10, eAxC_Id 20, eAxC_Id 30, eAxC_Id 40) and an ExtType 3 non-first data layer specifying a different precoding non-layer 0 layerID for Layer_1 through Layer 3.

The O-RU then receives additional Section Type 3 C-plane messages with a first eAxC_Id and a layerID for layer 0 (in an ExtType 3 extension format for the first data layer) for each of UE2 and UE3. UE2 is scheduled for TM2, which uses transmit diversity and relies on only one codebook layer for precoding. UE3 is scheduled for TM3, which relies on two codebook layers for precoding. In the example, the O-RU uses the association between eAxC_Ids and layerIDs that was already-established for UE1 across physical resource blocks of the current slot/carrier allocated for the subsequent UEs (UE2 AND UE3) scheduled for the slot/carrier.

In the example of FIG. 9, C-Plane messages corresponding to scheduled UEs with maximum number of layers were sent first followed by UEs with layers less than four (4) in a slot. This helps O-RU to create complete eAxC_Id to layerID mapping, after which the O-DU can even skip sending non-first data layer for all the following UEs since mapping is already created by O-RU with UE1. This can save fronthaul bandwidth and O-DU/O-RU processing. However, it is not necessary that the C-Plane messages corresponding to scheduled UEs with maximum number of layers be sent first. In some examples, at any time the complete set of C-Plane messages with for a certain number of layers are sent and the association between eAxC_Ids and layerIDs is established, any subsequently scheduled UE requiring an equal or lesser number of precoding layers can take advantage of the association.

Example 1 is method of wireless communication in an O-RU of a wireless network, that includes associating for a first extended antenna carrier identifier (eAxC_Id) corresponding to a layer 0 precoding layer identifier (layerID), the first eAxC_Id with one or more second eAxC_Ids. Each second eAxC_Id corresponds to a non-layer 0 precoding layerID. The O-RU receives, for a user equipment (UE), a control plane message of Section Type 1 or 3. The message includes an extension type (ExtType) 3 first data layer, along with the first eAxC_Id in a transport header. The ExtType 3 first data layer indicates a number of precoding layers. The O-RU then precodes user plane data for downlink physical resource blocks allocated to the UE using the layer 0 precoding layerID of the first eAxC_Id, and each associated non-layer 0 precoding layerID of the one more second eAxC_Ids required to complete the number of precoding layers.

Example 2 includes the Example 1, wherein the associating is performed in a management plane (M-Plane) of the O-RU. Example 3 includes any one of Example 1 and Example 2, wherein the associating comprises using an O-RAN EAXC-ID-GROUP-SUPPORTED function with 1) the first eAxC_Id corresponding to the layer 0 precoding layerID as a representative eAxC_Id of the function, and 2) each second eAxC_Id corresponding to a non-layer 0 precoding layerID as a member eAxC_Id of the function. Example 4 includes any one of Example 1 and Example 2, wherein the associating comprises identifying the first eAxC_Id corresponding to the layer 0 precoding layerID as a starting eAxC_Id, and the one or more second eAxC_Ids in order of increasing corresponding layerID as consecutive to the first eAxC_Id.

Example 5 includes any of Example 1-Example 4, wherein the receiving occurs before the associating. In such examples, the receiving further includes, for a particular UE of the at least one UE, receiving a set of subsequent C-Plane messages of the Section Type of the first C-Plane message.

Each subsequent C-Plane message includes 1) a different second eAxC_Id, and 2) an ExtType 3 non-first data layer specifying a different precoding non-layer 0 layerID. The first C-Plane message and the set of subsequent C-Plane messages specify each possible precoding layer associated with ExtType 3. In such examples, the precoding further includes using the association across physical resource blocks of a particular slot and a particular carrier allocated across the particular UE and any subsequent UE scheduled for the particular slot and the particular carrier.

Example 6 includes a Node B Open Radio Access Network (O-RAN) Category B radio unit (O-RU) including a memory and at least one processor coupled to the memory. The memory includes instructions executable by the at least one processor to cause the O-RU to perform the method of any one of Examples 1-5.

Example 7 includes a Node B Open Radio Access Network (O-RAN) Category B radio unit (O-RU), including means for performing the method of any one of Example 1-Example 5.

Example 8 includes a non-transitory computer-readable medium storing computer executable code, the code when executed by at least one processor cause the at least one processor to perform the method of any one of Example 1-Example 5.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:

1. A wireless communication method, comprising:
   in a Node B Open Radio Access Network (O-RAN) Category B radio unit (O-RU) of a wireless communication network:
   for a first extended antenna carrier identifier (eAxC_Id) corresponding to a layer 0 precoding layer identifier (layerID), associating the first eAxC_Id with one or more second eAxC_Ids, each second eAxC_Id corresponding to a different non-layer 0 precoding layerID;
   receiving, for each of at least one user equipment (UE), a first control plane (C-Plane) message of Section Type 1 or Section Type 3, wherein the first C-Plane message comprises an extension type (ExtType) 3 first data layer and includes the first eAxC_Id in a transport header of the first C-Plane message, and wherein the ExtType 3 first data layer indicates a number of precoding layers; and
   precoding user plane (U-Plane) data for downlink physical resource blocks allocated to each at least one UE using the layer 0 precoding layerID of the first eAxC_Id, and each associated non-layer 0 precoding layerID of the one or more second eAxC_Ids required to complete the number of precoding layers.

2. The method of claim 1, wherein the associating is performed in a management plane (M-Plane) of the O-RU.

3. The method of claim 2, wherein the associating comprises using an O-RAN EAXC-ID-GROUP-SUPPORTED function with 1) the first eAxC_Id corresponding to the layer 0 precoding layerID as a representative eAxC_Id of the function, and 2) each second eAxC_Id corresponding to a non-layer 0 precoding layerID as a member eAxC_Id of the function.

4. The method of claim 2, wherein the associating comprises identifying the first eAxC_Id corresponding to the layer 0 precoding layerID as a starting eAxC_Id, and the one or more second eAxC_Ids in order of increasing corresponding layerID as consecutive to the first eAxC_Id.

5. The method of claim 1, wherein:
   the receiving occurs before the associating;
   the receiving further comprises, for a particular UE of the at least one UE, receiving a set of subsequent C-Plane messages of the Section Type of the first C-Plane message, each subsequent C-Plane message comprising 1) a different second eAxC_Id, and 2) an ExtType 3 non-first data layer specifying a different precoding non-layer 0 layerID, wherein the first C-Plane message and the set of subsequent C-Plane messages specify each possible precoding layer associated with ExtType 3; and
   the precoding further comprises using the association across physical resource blocks of a particular slot and a particular carrier allocated across the particular UE and any subsequent UE scheduled for the particular slot and the particular carrier.

6. An Node B Open Radio Access Network (O-RAN) Category B radio unit (O-RU) comprising:
   a memory; and
   at least one processor coupled to the memory, the memory including instructions executable by the at least one processor to cause the O-RU to:
   for a first extended antenna carrier identifier (eAxC_Id) corresponding to a layer 0 precoding layer identifier (layerID), associate the first eAxC_Id with one or more second eAxC_Ids, each second eAxC_Id corresponding to a different non-layer 0 precoding layerID;

receive, for each of at least one user equipment (UE), a first control plane (C-Plane) message of Section Type 1 or Section Type 3, wherein the first C-Plane message comprises an extension type (ExtType) 3 first data layer and includes the first eAxC_Id in a transport header of the first C-Plane message, and wherein the ExtType 3 first data layer indicates a number of precoding layers; and precode user plane (U-Plane) data for downlink physical resource blocks allocated to each at least one UE using the layer 0 precoding layerID of the first eAxC_Id, and each associated non-layer 0 precoding layerID of the one or more second eAxC_Ids required to complete the number of precoding layers.

7. The O-RU of claim 6, wherein the associating is performed in a management plane (M-Plane) of the O-RU.

8. The O-RU of claim 7, wherein the associating comprises using an O-RAN EAXC-ID-GROUP-SUPPORTED function with 1) the first eAxC_Id corresponding to the layer 0 precoding layerID as a representative eAxC_Id of the function, and 2) each second eAxC_Id corresponding to a non-layer 0 precoding layerID as a member eAxC_Id of the function.

9. The O-RU of claim 7, wherein the associating comprises identifying the first eAxC_Id corresponding to the layer 0 precoding layerID as a starting eAxC_Id, and the one or more second eAxC_Ids in order of increasing corresponding layerID as consecutive to the first eAxC_Id.

10. The O-RU of claim 6, wherein:
the receiving occurs before the associating;
the receiving further comprises, for a particular UE of the at least one UE, receiving a set of subsequent C-Plane messages of the Section Type of the first C-Plane message, each subsequent C-Plane message comprising 1) a different second eAxC_Id, and 2) an ExtType 3 non-first data layer specifying a different precoding non-layer 0 layerID, wherein the first C-Plane message and the set of subsequent C-Plane messages specify each possible precoding layer associated with ExtType 3; and
the precoding further comprises using the association across physical resource blocks of a particular slot and a particular carrier allocated across the particular UE and any subsequent UE scheduled for the particular slot and the particular carrier.

11. A Node B Open Radio Access Network (O-RAN) Category B radio unit (O-RU), comprising:
for a first extended antenna carrier identifier (eAxC_Id) corresponding to a layer 0 precoding layer identifier (layerID), means for associating the first eAxC_Id with one or more second eAxC_Ids, each second eAxC_Id corresponding to a different non-layer 0 precoding layerID;
means for receiving, for each of at least one user equipment (UE), a first control plane (C-Plane) message of Section Type 1 or Section Type 3, wherein the first C-Plane message comprises an extension type (ExtType) 3 first data layer and includes the first eAxC_Id in a transport header of the first C-Plane message, and wherein the ExtType 3 first data layer indicates a number of precoding layers; and
means for precoding user plane (U-Plane) data for downlink physical resource blocks allocated to each at least one UE using the layer 0 precoding layerID of the first eAxC_Id, and each associated non-layer 0 precoding layerID of the one or more second eAxC_Ids required to complete the number of precoding layers.

12. The O-RU of claim 11, wherein the associating is performed in a management plane (M-Plane) of the O-RU.

13. The O-RU of claim 12, wherein the means for associating comprises using an O-RAN EAXC-ID-GROUP-SUPPORTED function with 1) the first eAxC_Id corresponding to the layer 0 precoding layerID as a representative eAxC_Id of the function, and 2) each second eAxC_Id corresponding to a non-layer 0 precoding layerID as a member eAxC_Id of the function.

14. The O-RU of claim 12, wherein the means for associating comprises means for identifying the first eAxC_Id corresponding to the layer 0 precoding layerID as a starting eAxC_Id, and the one or more second eAxC_Ids in order of increasing corresponding layerID as consecutive to the first eAxC_Id.

15. The O-RU of claim 11, wherein:
the receiving occurs before the associating;
the means for receiving further comprises, for a particular UE of the at least one UE, means for receiving a set of subsequent C-Plane messages of the Section Type of the first C-Plane message, each subsequent C-Plane message comprising 1) a different second eAxC_Id, and 2) an ExtType 3 non-first data layer specifying a different precoding non-layer 0 layerID, wherein the first C-Plane message and the set of subsequent C-Plane messages specify each possible precoding layer associated with ExtType 3; and
the means for precoding further comprises means for using the association across physical resource blocks of a particular slot and a particular carrier allocated across the particular UE and any subsequent UE scheduled for the particular slot and the particular carrier.

16. A non-transitory computer-readable medium storing computer executable code, the code when executed by at least one processor of a Node B Open Radio Access Network (O-RAN) Category B radio unit (O-RU) cause the O-RU to:
for a first extended antenna carrier identifier (eAxC_Id) corresponding to a layer 0 precoding layer identifier (layerID), associate the first eAxC_Id with one or more second eAxC_Ids, each second eAxC_Id corresponding to a different non-layer 0 precoding layerID;
receive, for each of at least one user equipment (UE), a first control plane (C-Plane) message of Section Type 1 or Section Type 3, wherein the first C-Plane message comprises an extension type (ExtType) 3 first data layer and includes the first eAxC_Id in a transport header of the first C-Plane message, and wherein the ExtType 3 first data layer indicates a number of precoding layers; and
precode user plane (U-Plane) data for downlink physical resource blocks allocated to each at least one UE using the layer 0 precoding layerID of the first eAxC_Id, and each associated non-layer 0 precoding layerID of the one or more second eAxC_Ids required to complete the number of precoding layers.

17. The computer-readable medium of claim 16, wherein the associating is performed in a management plane (M-Plane) of the O-RU.

18. The computer-readable medium of claim 17, wherein the associating comprises using an O-RAN EAXC-ID-GROUP-SUPPORTED function with 1) the first eAxC_Id corresponding to the layer 0 precoding layerID as a representative eAxC_Id of the function, and 2) each second eAxC_Id corresponding to a non-layer 0 precoding layerID as a member eAxC_Id of the function.

19. The computer-readable medium of claim 17, wherein the associating comprises identifying the first eAxC_Id corresponding to the layer 0 precoding layerID as a starting eAxC_Id, and the one or more second eAxC_Ids in order of increasing corresponding layerID as consecutive to the first eAxC_Id.

20. The computer-readable medium of claim 16, wherein:
the receiving occurs before the associating;
the receiving further comprises, for a particular UE of the at least one UE, receiving a set of subsequent C-Plane messages of the Section Type of the first C-Plane message, each subsequent C-Plane message comprising 1) a different second eAxC_Id, and 2) an ExtType 3 non-first data layer specifying a different precoding non-layer 0 layerID, wherein the first C-Plane message and the set of subsequent C-Plane messages specify each possible precoding layer associated with ExtType 3; and
the precoding further comprises using the association across physical resource blocks of a particular slot and a particular carrier allocated across the particular UE and any subsequent UE scheduled for the particular slot and the particular carrier.

* * * * *